United States Patent [19]

White

[11] 4,060,333
[45] Nov. 29, 1977

[54] APPARATUS FOR CUTTING DISKS FROM SHEETS

[76] Inventor: John T. White, 100 Pike Road, Birmingham, Ala. 35218

[21] Appl. No.: 705,093

[22] Filed: July 14, 1976

[51] Int. Cl.² .............................................. B23D 45/14
[52] U.S. Cl. ..................................... 408/103; 83/454; 269/87.3; 408/204; 408/241 B
[58] Field of Search ....................... 408/97, 96, 95, 92, 408/103, 87, 67, 68, 241 B, 204–206; 83/454, 455; 269/87.3, 87.2, 87.1

[56] References Cited

U.S. PATENT DOCUMENTS

| 1,808,472 | 6/1931 | Mielke | 408/205 X |
|---|---|---|---|
| 1,825,277 | 9/1931 | Lytle | 408/204 X |
| 1,911,741 | 5/1933 | Berry | 408/67 |
| 2,024,390 | 12/1935 | Roesch | 408/92 X |
| 2,267,336 | 12/1941 | Kindelberger | 408/97 X |
| 2,315,318 | 3/1943 | Deubler, Jr. | 408/97 |
| 2,559,343 | 7/1951 | Hyland | 83/455 X |
| 2,564,786 | 8/1951 | Lubbert | 408/103 X |
| 2,886,080 | 5/1959 | Rappeport | 408/97 X |
| 3,701,352 | 10/1972 | Bosworth | 408/97 X |

Primary Examiner—J. M. Meister
Attorney, Agent, or Firm—Woodford R. Thompson, Jr.

[57] ABSTRACT

Disk cutting apparatus embodying a pair of detachable clamping elements having flat surfaces facing each other for clamping a stack of sheets of material therebetween from which the disks are cut. At least one opening is provided through a clamping element and is of a size corresponding to the size of the disk to be cut. A cutter extends through the opening and has inner and outer cylindrical surfaces with the outer surface being of a size corresponding to the size of the opening. The inner surface at one end of the cutter is beveled to provide an outwardly flaring annular surface which terminates in an annular cutting edge.

4 Claims, 3 Drawing Figures

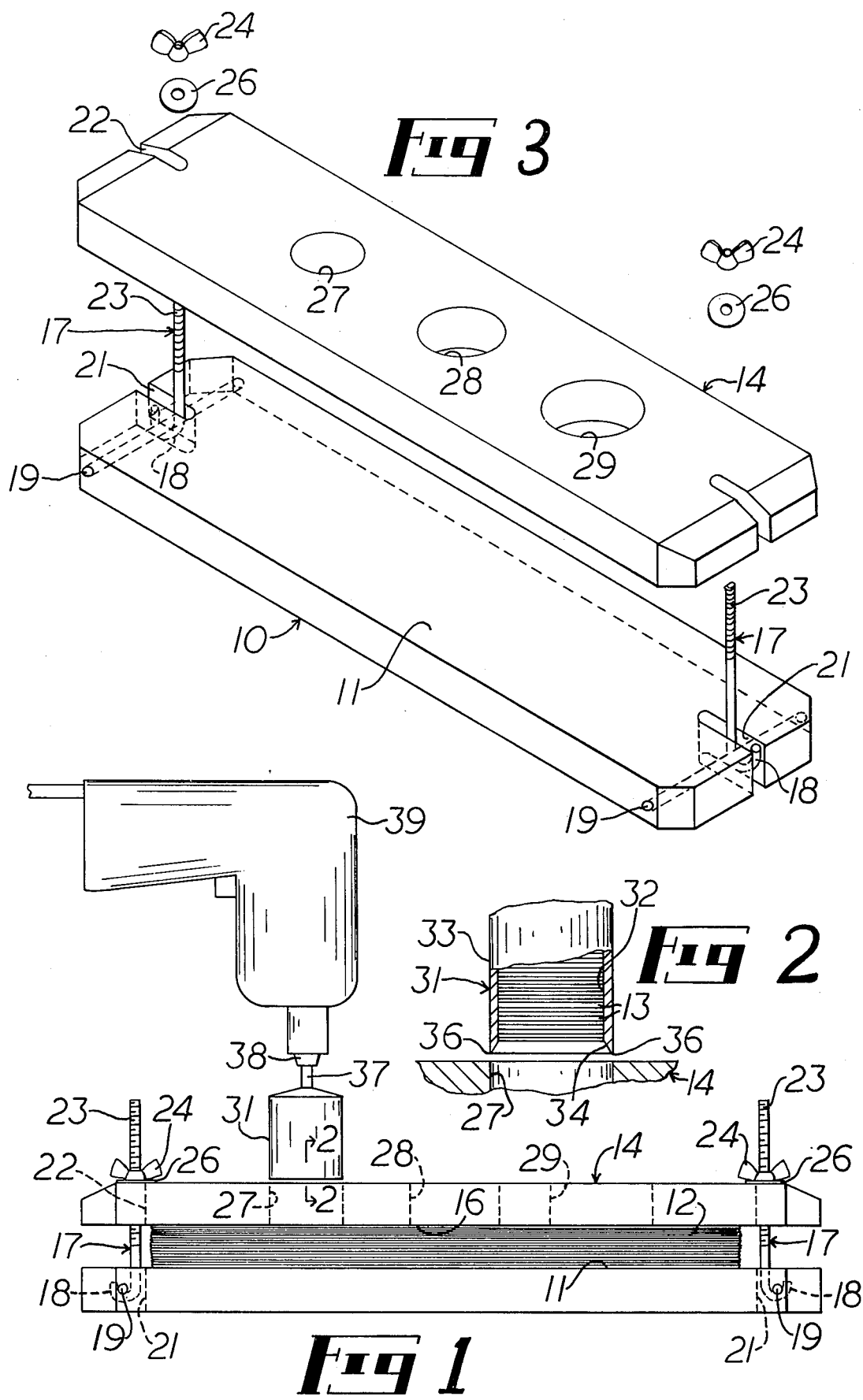

APPARATUS FOR CUTTING DISKS FROM SHEETS

BACKGROUND OF THE INVENTION

This invention relates to a tool for cutting disks from sheets of material, such as man-made fabrics or synthetic materials. The invention is particularly adapted for cutting disk-like members which are formed into buttons employed in the upholstering of furniture and the like.

Heretofore, in the art to which my invention relates, various type cutting tools have been proposed for cutting holes into materials, such as paper. For example, the Sparks U.S. Pat. No. 1,219,677, dated Mar. 20, 1917, and the Dom U.S. Pat. No. 1,279,495, dated Sept. 24, 1918, show tubular perforators wherein holes of perforations are made in paper. Both of these patents show narrow restrictions in the tubular member inwardly of and above the cutting edge whereby any disk of paper cut would be distorted as it moves upwardly. Also, difficulties have been encountered in holding the sheets of material from which the disks are cut during the cutting operation so as to prevent slippage between adjacent sheets. That is, where adjacent sheets slip relative to each other during the cutting operation, the disks are not cut accurately and at the same time they do not pass freely into the cylindrical chamber positioned above the cutting edge.

SUMMARY OF THE INVENTION

In accordance with my invention, I provide improved means for retaining a stack of sheets of material in place as the disks are cut. A stack of sheets of the material to be cut are clamped between oppositely disposed clamping elements with one clamping element having at least one opening therethrough for passing the cutter member. The cutter member has inner and outer cylindrical surfaces with the outer cylindrical surface being of a size corresponding to the size of the opening through the clamping element. The inner cylindrical surface at one end of the cutter member is beveled to provide an outwardly flaring annular surface which terminates in an annular cutting edge. The end of the cutter member opposite the cutting edge is connected to a suitable rotary power unit whereby the cutter member is rotated during the cutting operation. The provision of the cylindrical inner surface for the cutter member permits free movement of the cut disks upwardly into the cylindrical portion of the cutter member whereby the disks are stored temporarily and may be later released through the lower end of the cutter member.

DESCRIPTION OF THE DRAWINGS

Apparatus embodying features of my invention is illustrated in the accompanying drawing, forming a part of this application, in which:

FIG. 1 is a side elevational view showing the apparatus in operative position with the cutter member in raised position just after making a cut through a stack of sheets of material from which the disks are cut;

FIG. 2 is an enlarged, fragmental, sectional view taken generally along the line 2—2; and, FIG. 3 is a perspective, exploded view showing the two clamping elements and the means for securing the clamping elements in place.

DETAILED DESCRIPTION

Referring now to the drawing for a better understanding of my invention, I show a lower clamping element 10 having a flat upper surface 11 which is adapted to engage the lower side of a stack of sheets of material 12 from which the disks, indicated at 13, are cut. The sheets of material 12 may be of a man-made fabric or synthetic fabric from which buttons or the like are made for use in upholstering furniture.

Cooperating with the lower clamping element 10 is an upper clamping element 14 having a flat undersurface 16 which is adapted to engage the upper side of the stack of sheets 12, as shown in FIG. 1. The clamping elements 10 and 14 are shown as being detachably connected to each other adjacent each end thereof by elongated connector members 17. The lower end of each connector member 17 is provided with a hook-like portion 18 which is adapted to engage a transverse pin 19 carried by each end of the lower clamping element 10. That is, a suitable transverse opening is provided adjacent each end of the connector element 10 for receiving the pin 19. As shown in FIG. 3, outwardly opening slots 21 are provided at each end of the lower clamping element 10 for receiving the hook-shaped portion 18 whereby the connector members 17 may be easily connected to the pins 19 and at the same time the connector members 17 are adapted for pivotal movement relative to the pins 19.

Outwardly opening slots 22 are provided at each end of the upper clamping element 14 in position to receive the upper ends of the connector members 17 which are threaded as at 23. After inserting the connector members 17 into the outwardly opening slots 22, the upper clamping element 14 is urged toward the stack of sheets of material 12 by suitable wing nuts 24 whereby the stack of sheets of material 12 are clamped firmly between the clamping elements 10 and 14, as shown in FIG. 1. A washer 26 is carried by each connector member 17 inwardly of the wing nut 24 whereby it bears against the adjacent, upper surface of the clamping element 14.

As shown in FIGS. 1 and 3, openings 27, 28 and 29 are provided through the upper clamping element 14 with each opening extending perpendicular to the sheets of material 12 and being of a different diameter so as to accomodate a cutter member 31 of different sizes whereby disks 13 of different sizes may be cut from the sheets of material 12.

As shown in FIG. 2, the cutter member comprises a cylindrical body portion having an inner cylindrical surface 32 and an outer cylindrical surface 33 with the outer cylindrical surface being of a size corresponding to the size of the openings 27, 28 or 29, as the case may be. The inner cylindrical surface 32 at the lower end of the cutter member 31 is beveled as at 34 to provide an outwardly flaring annular surface which terminates in an annular cutting edge 36. By providing the inner cylindrical surface 32 which extends a substantial distance above the beveled surface 34, the disks 13 being cut move freely into the cylindrical cutter member 31 whereby they may be stored until the cut is made through the stack of sheets of material 12. The disks 13 may then be discharged from the lower end of the cutter member 31 with a minimum of effort. Since the entire inner surface 32 is cylindrical, there is no distortion of the disks 13 as they move upwardly and inwardly of the cutter member 31. Also, by providing inner and outer cylindrical surfaces 31 and 32, respectively, the cutting edge 36 remains the same diameter regardless of the times the cutting edge is sharpened. The upper end of the cutter member 31 carries a shaft-like member 37 which is adapted to fit a conventional chuck 38 of a power tool 39, as shown in FIG. 1.

From the foregoing, the operation of my improved apparatus for cutting disks from sheets of material will be readily understood. The sheets are arranged in a stack and placed on the upper surface of the lower clamping element 10, as shown in FIG. 1. The upper clamping element 14 is then placed on top of the stack of sheets 12 and the connector members 17 are then swung inwardly of the outwardly opening slots 22 to the position shown in FIG. 1 whereupon the wing nuts 24 are then tightened to force the clamping elements 10 and 14 toward each other to thereby firmly clamp the stack of sheets 12 therebetween. With a stack of sheets 12 thus clamped in place, the cylindrical cutter member 31 is inserted through the opening 27 in the upper clamping element 14 as the power unit 39 is energized whereupon the cutter member 31 rotates as it engages the sheets 12 to thus make a smooth, annular cut through the stack of sheets 12 to thus form the disks 13 which are stored in the cylindrical body of the cutter member 31 until the cutter member is withdrawn from the opening 27.

From the foregoing, it will be seen that I have devised improved apparatus for cutting disks from sheets of material. By providing a rotary cutter member having inner and outer cylindrical surfaces, the disks move freely inwardly of the cutter member whereby they are stored until the cutter member passes all the way through the stack of sheets 12. Also, by providing detachable means for connecting the upper clamping member of the lower clamping member, the stack of sheets 12 may be easily and quickly clamped in place whereupon they are then cut by the rotary cutter member 31. Furthermore, by providing a cylindrical outer surface for the cutter member, the circumference of the cutting edge remains the same regardless of the number of times the cuttting edge is sharpened.

While I have shown my invention in but one form, it will be obvious to those skilled in the art that it is not so limited, but is susceptible of various changes and modifications without departing from the spirit thereof.

What I claim is:

1. Apparatus for cutting disks from sheets of material comprising:
   a. a first clamping element having a flat surface disposed to engage one side of and support a stack of sheets of material from which said disks are to be cut,
   b. a second clamping element having a flat surface disposed to engage the other side of said stack of sheets,
   c. an elongated connector member having a hook-shaped end pivotally connected to a transverse pin carried by each end of said first clamping element with the other end of each said connector member being adapted to extend toward said second clamping element,
   d. releasable means connecting said other end of each said connector member to one adjacent end of said second clamping element,
   e. there being at least one opening through said second clamping element extending perpendicular to said sheets of material and being of a size corresponding to the size of the disks to be cut,
   f. a cutter member having inner and outer cylindrical surfaces with the outer cylindrical surface being of a size corresponding to the size of said opening through said second clamping element with the inner cylindrical surface being of a constant diameter and providing an unrestricted cylindrical chamber for receiving the cut disks and with said inner cylindrical surface at one end of said cutter member being beveled to provide an outwardly flaring annular surface which terminates in an annular cutting edge, and
   g. means operatively connecting the other end of said cutter member to rotary power means.

2. Apparatus for cutting disks as defined in claim 1 in which slots are provided at each end of said first clamping element for receiving the hook-shaped ends of said connector members.

3. Apparatus for cutting disks as defined in claim 2 in which an outwardly opening slot is provided at each end of said second clamping element for receiving said other end of each said connector member so that said other end of each said connector member may swing into and out of engagement with the outwardly opening slot adjacent thereto.

4. Apparatus for cutting disks as defined in claim 3 in which said other end of each said connector member is threaded and receives a retaining nut.

* * * * *